United States Patent
Zhang et al.

(10) Patent No.: US 11,927,437 B2
(45) Date of Patent: Mar. 12, 2024

(54) ULTRASONIC MEASUREMENT OF SURFACE PROFILE AND AVERAGE DIAMETER OF A TUBE

(71) Applicant: Evident Scientific, Inc., Waltham, MA (US)

(72) Inventors: Jinchi Zhang, Quebec (CA); Nicolas Badeau, Quebec (CA)

(73) Assignee: Evident Scientific, Inc., Waltham, MA (US)

(*) Notice: Subject to any disclaimer, the term of this patent is extended or adjusted under 35 U.S.C. 154(b) by 448 days.

(21) Appl. No.: 17/221,492

(22) Filed: Apr. 2, 2021

(65) Prior Publication Data

US 2021/0223036 A1 Jul. 22, 2021

Related U.S. Application Data

(63) Continuation of application No. 16/034,003, filed on Jul. 12, 2018, now Pat. No. 10,982,955.

(51) Int. Cl.
| | |
|---|---|
| *G01B 17/06* | (2006.01) |
| *G01B 17/02* | (2006.01) |
| *G01N 29/46* | (2006.01) |
| *G01S 7/52* | (2006.01) |
| *G01S 15/08* | (2006.01) |

(52) U.S. Cl.
CPC ............. *G01B 17/06* (2013.01); *G01B 17/02* (2013.01); *G01N 29/46* (2013.01); *G01S 7/52006* (2013.01); *G01S 15/08* (2013.01)

(58) Field of Classification Search
CPC ...... G01B 17/06; G01N 29/46; G01S 7/52006
See application file for complete search history.

(56) References Cited

U.S. PATENT DOCUMENTS

| | | | |
|---|---|---|---|
| 5,077,908 A | 1/1992 | Moore | |
| 5,156,636 A * | 10/1992 | Kuljis | G01B 17/02 73/622 |
| 6,708,128 B2 | 3/2004 | Bankestroem et al. | |
| 7,093,469 B2 * | 8/2006 | Yamane | G01B 15/02 702/170 |
| 7,140,253 B2 * | 11/2006 | Merki | G01N 29/07 73/620 |
| 7,386,416 B2 | 6/2008 | Glascock | |
| 10,982,955 B2 | 4/2021 | Zhang et al. | |
| 2008/0071496 A1 * | 3/2008 | Glascock | G01B 17/02 702/155 |
| 2020/0018594 A1 | 1/2020 | Zhang et al. | |

OTHER PUBLICATIONS

"U.S. Appl. No. 16/034,003, Notice of Allowance dated Dec. 16, 2020", 12 pgs.

Moore, D, "Considerations in multiprobe roundness measurement", J. Phys. E: Sci. Instrum. 22, (1989), 339-343.

* cited by examiner

*Primary Examiner* — Regis J Betsch

(74) *Attorney, Agent, or Firm* — Schwegman Lundberg & Woessner, P.A.

(57) ABSTRACT

Disclosed is a system and method for ultrasonic measurement of the average diameter and surface profile of a tube. A calibration block is used to calibrate the average tube diameter, and a correction is applied to account for any temperature difference of the couplant between calibration and test measurements. By using a linear probe, or a single probe with a finely pitched helicoidal scan, errors in diameter measurement due to presence of surface pits may be compensated.

23 Claims, 15 Drawing Sheets

ULTRASONIC MEASUREMENT OF SURFACE PROFILE AND AVERAGE DIAMETER OF A TUBE

CLAIM OF PRIORITY

This patent application is a continuation of Jinchi Zhang et al., U.S. application Ser. No. 16/034,003, titled "ULTRASONIC MEASUREMENT OF SURFACE PROFILE AND AVERAGE DIAMETER OF A TUBE," filed Jul. 12, 2018, the benefit of which is hereby presently claimed, and the entirety of which is hereby incorporated herein by reference.

FIELD OF THE INVENTION

The invention relates to methods and devices for measuring the dimensions and mechanical properties of pipes, tubes and the like. More particularly, it relates to an ultrasonic device and algorithm for measuring the deviation from the nominal tube diameter, without making any assumptions about the shape of the tube.

BACKGROUND OF THE INVENTION

The ideal cross-section of a pipe or tube is perfectly circular, providing maximum strength and ease of joining adjacent tubing sections. Methods of measuring deviation of tubes from roundness are known in the art.

Known roundness measurement methods are often performed using a displacement transducer mounted between two location members which contact the surface of the tube and locate the transducer. As the tube under test is rotated with respect to the transducer and the location members, the transducer measures a displacement which is a weighted combination of the departures from roundness of the transducer and the contact points of the two location members. The advantage of this geometrical arrangement is that the measurement can be done with just one transducer, precision rotary bearings are not required, the axis of the tube does not have to be accurately aligned to the axis of rotation, and access to only one side of the rotating tube is required.

Moore (J. Phys. E: Sci. Instrum. 22 (1989) 339-343 and U.S. Pat. No. 5,077,908) has presented design considerations and algorithms for such a geometrical arrangement. However, Moore is silent on the use of ultrasound transducers, which have the advantage that they are able to simultaneously measure the wall thickness and the deviation from roundness of the tube under test. Furthermore, Moore's algorithms are applied to a two-dimensional circular object with no consideration of any profile variations in the third dimension, which is the axial length of the tube.

Glasscock (U.S. Pat. No. 7,386,416) teaches use of an ultrasonic probe for measuring wall thickness and ovality. However, Glasscock's method is capable of measuring only the maximum and minimum deviation from the average diameter of the tube, thereby calculating the ovality. FIG. 1A illustrates an ovality measurement of a tube 4' having a nominally circular outer surface 2'. According to the method of Glasscock, a maximum diameter $D_{max}$ and a minimum diameter $D_{min}$ of tube 4' may be measured along two perpendicular axes, and tube 4' is assumed to have an oval shape as illustrated in FIG. 1A.

FIG. 1B illustrates a roundness measurement of a tube 4 whose diameter has non-oval deviations from an average circle 2, wherein average circle 2 is a circle having the average diameter of tube 4. Tube 4 is a better general representation than tube 4' of observed roundness deviations in tubes. Note, however, that the deviations from roundness of tube 4 have been exaggerated for clarity of presentation. Tube 4 may be characterized by the maximum diameter $D_{max}$ and the minimum diameter $D_{min}$, but measurement of deviations 8 from average circle 2 for all positions around the circumference of tube 4 would provide a much better characterization. Measurements of such other, non-oval, deviations from roundness are not possible with the method of Glasscock.

In general, users wish to determine variations along the axial length of the average diameter of the tube, not merely the roundness profile which is a measure of deviations from a nominal tube diameter. A problem of ultrasonic roundness methods in existing practice is that the measurement of the average tube diameter has low precision, and there is no method to calibrate for higher accuracy. Moreover, ultrasonic measurement of tube diameter has been found to be dependent on the temperature of the couplant fluid (usually water), and there is no existing method to achieve adequate temperature compensation.

A general problem of ultrasonic roundness methods in existing practice is that when a pit in the tube surface is encountered, the two location members, being much larger than the pit, will not be influenced, whereas the ultrasonic beam will probe the bottom of the pit. This leads to an overestimate of the average diameter and an inaccurate roundness measurement.

There therefore exists a need for an ultrasonic method capable of measuring deviations from tube roundness as a function of axial position, while at the same time providing an accurate measurement of the axial dependence of tube average diameter, the average diameter measurement being calibrated, independent of temperature variations, and unaffected by the presence of pits in the tube surface.

A method and system for accurate measurement of roundness and calibrated average diameter has been disclosed in a related co-pending U.S. application Ser. No. 16/033,949 filed on the same day as the current disclosure. However, the co-pending disclosure does not teach compensation of temperature variations of the couplant, nor does it teach compensation for the presence of pits in the tube surface.

SUMMARY OF THE INVENTION

It is a general objective of the present disclosure to have a measurement system and an algorithm for roundness and average diameter which is capable of measuring the deviation from the nominal diameter of a tube, without making any assumptions about the shape of the tube.

The objective is achieved by measuring diameters of a random polygonal shape and then calculating the deviations from an averaged circle having a diameter equal to the average of all the diameter measurements.

The measurement system of the present disclosure uses ultrasound time-of-flight measurements to measure the diameter of the tube at a substantial number of angles around the tube (angles ranging from 0° to 360°).

The roundness algorithm of the present disclosure represents the functional dependence of diameter with angle as a sum of Fourier components, each component being a harmonic representing an integer number of undulations per revolution. The number of harmonics depends on the measurement accuracy required. The roundness is then calculated from the deviation of the Fourier sum from the averaged circle.

Note that the roundness algorithm of the present disclosure does not merely use the maximum and minimum diameters to determine the tube ovality. The roundness algorithm instead determines a number of harmonics 0, 2, ... N, where the harmonic 0 corresponds to the diameter of the averaged circle, harmonic 2 corresponds to the ovality component, and higher harmonics complete the definition of the actual measured tube diameter angular profile.

A novel aspect of the present invention is that the roundness algorithm is not based on the assumption that the circles are oval or round and does not use ovality to achieve the calculation of the thickness of the tube.

It is a further objective of the present disclosure to provide a calibration method allowing highly accurate measurements of the average diameter. This objective is achieved by providing a calibration block configured to provide the same ultrasonic path length as a perfectly round tube having the nominal diameter.

A further objective is to provide a calibration method which is independent of temperature variations of the couplant between the calibration and the measurement. This objective is achieved by correcting the measurement with knowledge of the temperature dependence of sound velocity in the couplant.

A further objective is to provide a measurement system wherein the measurement of average diameter is not affected by the presence of pits in the surface of the tube. This is achieved by providing a linear ultrasonic probe and contact bars whose length in the tube's axial direction is much greater than the dimension of a surface pit. The measurement of average diameter may then be based upon those ultrasonic beams from the linear probe which are unaffected by presence of the pits.

DETAILED DESCRIPTION OF PREFERRED EMBODIMENT

Figure 1B:
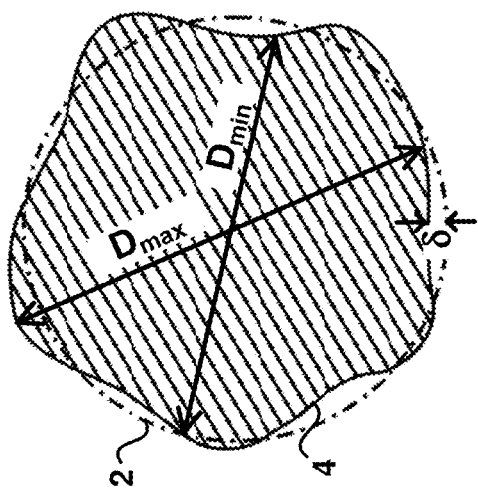
FIG. 1B is a schematic representation of a roundness measurement.
Figure 1A:
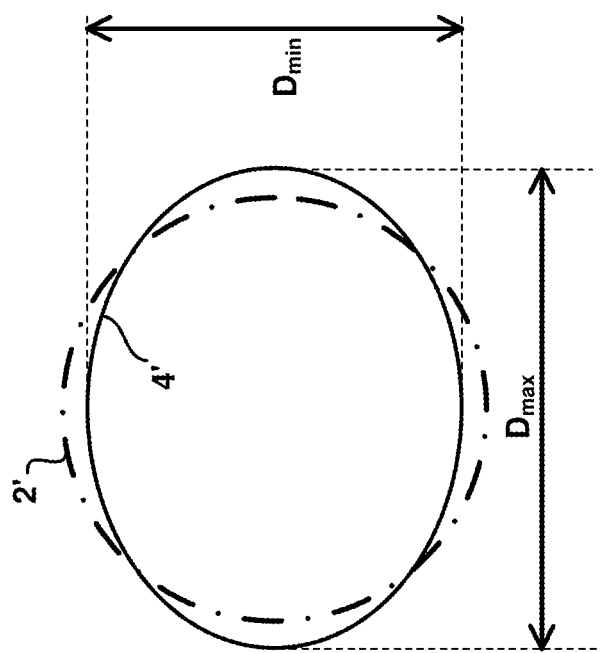
FIG. 1A is a schematic representation of an ovality measurement.
Figure 2A:
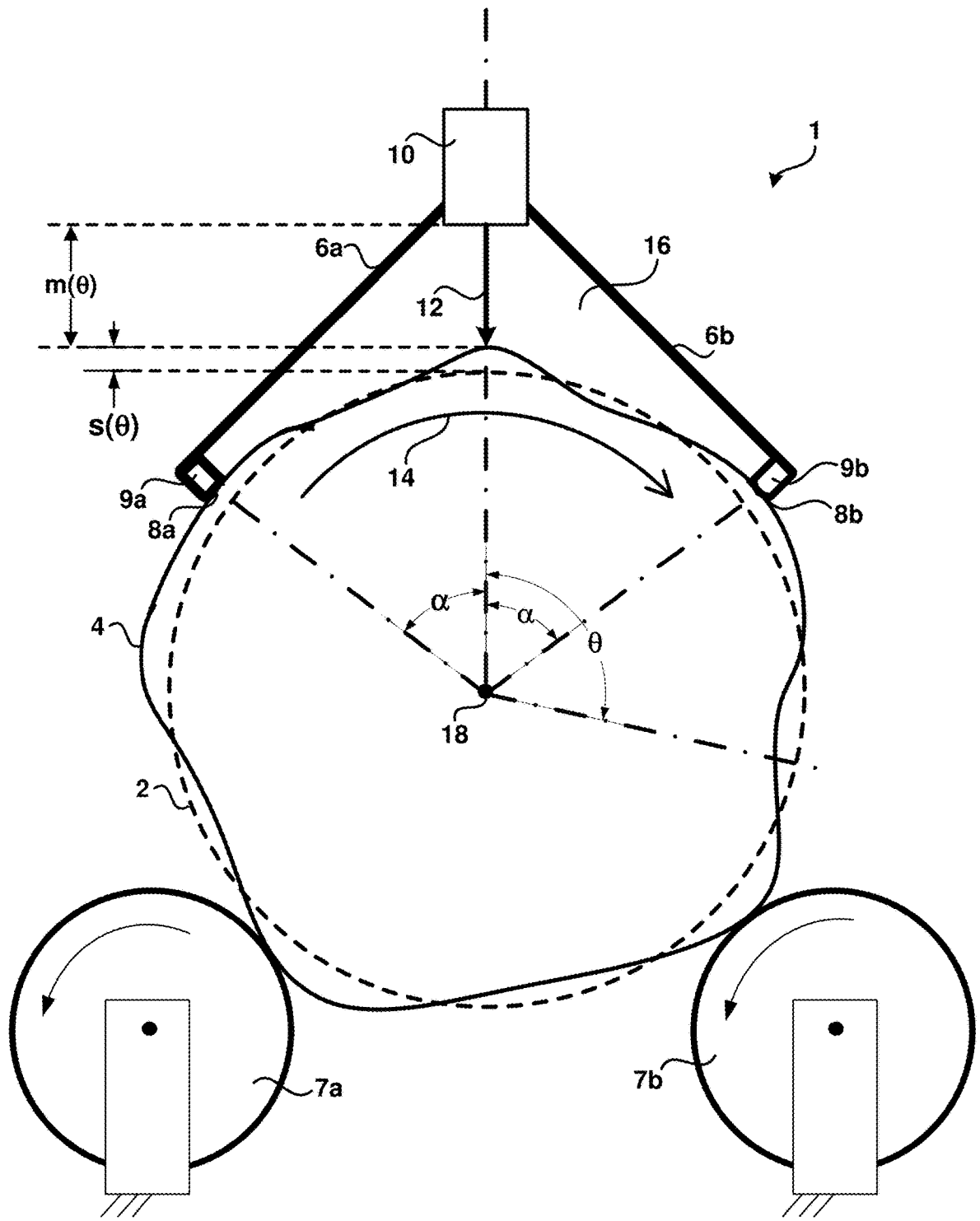
FIG. 2A is a schematic representation of a test measurement system for roundness profiling of a tube according to the present disclosure.

FIG. 2A is a schematic representation of a test measurement system 1 according to the present disclosure, wherein test measurement system 1 is used for measurement of roundness and average diameter of a tube 4 having a tube axis 18. Note that the deviations from roundness of tube 4 illustrated in FIG. 2 are not to scale, but have been exaggerated for the purpose of presentation. An ultrasonic probe 10 emits an ultrasonic beam 12 which measures time of flight (TOF) in a couplant fluid 16 between ultrasonic probe 10 and the outer surface of tube 4. Ultrasonic probe 10 may be a single probe or may be a linear probe array having the direction of the linear array substantially parallel to the axis of tube 4. In an embodiment, probe 10 may be a linear phased array probe having 168 elements and an active length of 139 mm, but other probe types are possible and all are within the scope of the present disclosure. Ultrasonic beam 12 may therefore be a single beam or a linearly scanned beam with the scanning direction substantially parallel to axis 18. Support frames 6a and 6b support ultrasonic probe 10 by contacting tube 4 at lines of contact 8a and 8b respectively, wherein lines of contact 8a and 8b are substantially parallel to axis 18 and are defined by the contact of contact bars 9a and 9b respectively with the surface of tube 4. Lines of contact 8a and 8b each subtend an angle α with respect to the direction of ultrasonic beam 12. Tube 4 is rotated about axis 18 as illustrated by an arrow 14, the rotation being effected by rollers 7a and 7b, and the rotation of tube 4 being represented by a rotation angle θ which varies from 0 to 2π during a single revolution of tube 4. Couplant fluid 16, which in an embodiment may be water, is retained in an enclosed space between probe 10, support frames 6a and 6b and tube 4. With knowledge of the sound velocity in couplant fluid 16, a time of flight measurement between ultrasonic probe 10 and the outer surface of tube 4 may be converted to a displacement measurement m(θ). The roundness profile of tube 4 is represented by s(θ), which is the dependence on angle θ of the deviation between the outer surface of tube 4 and an average circle 2.

Figure 2B:
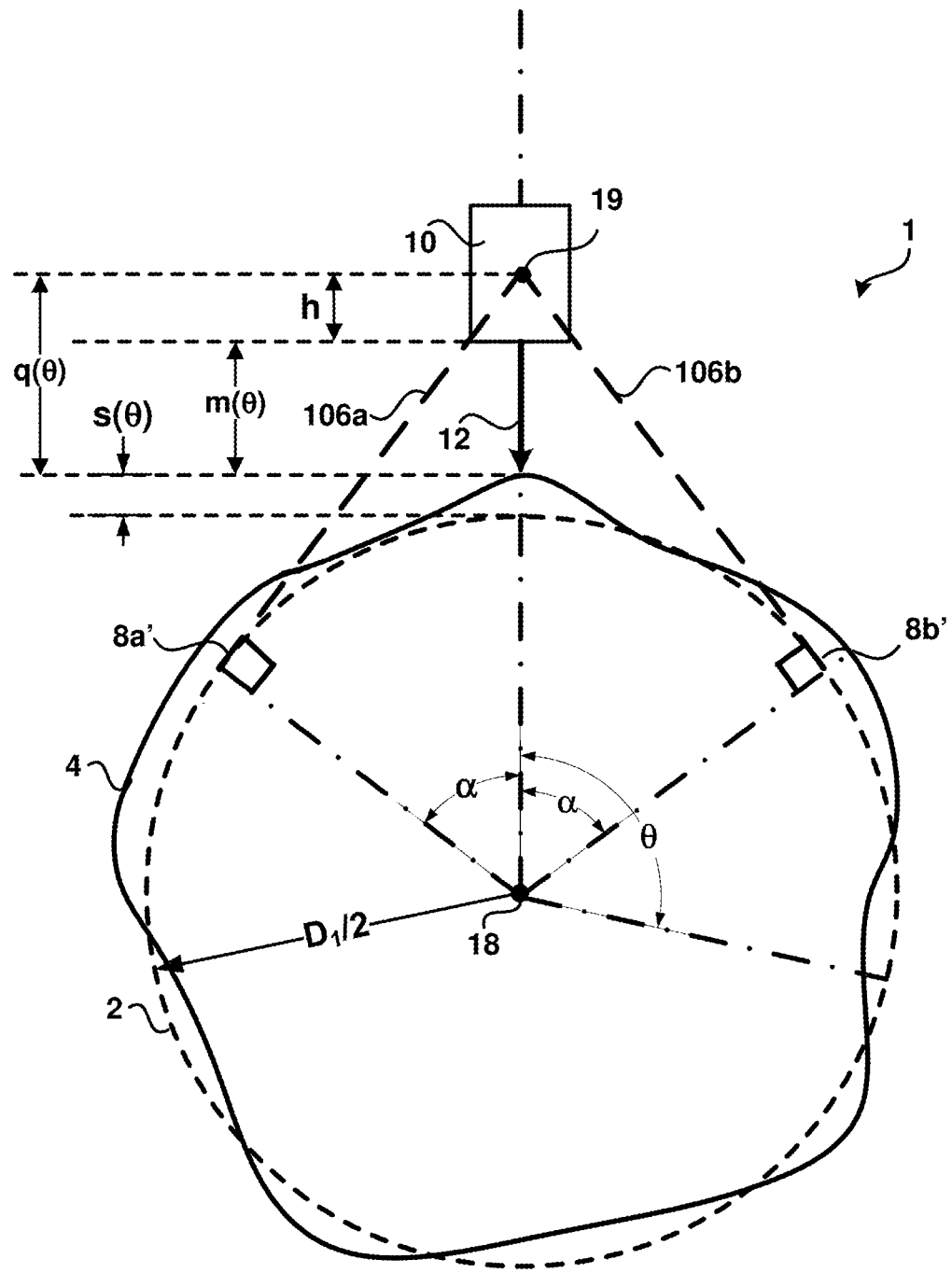
FIG. 2B is a schematic representation of parameters used for determination of the average diameter of a tube.

FIG. 2B is a schematic representation of parameters used for measurement of average circle 2, wherein average circle 2 is a circle having a diameter $D_1$, which is the average diameter of tube 4. A line 106a is tangential at a line of contact 8a' on average circle 2 and a line 106b is tangential at a line of contact 8b' on average circle 2, wherein lines of contact 8a' and 8b' both subtend angle α with respect to the direction of ultrasonic beam 12. Note that, under the assumption that roundness deviations between tube 4 and average circle 2 are small, lines of contact 8a' and 8b' are close to, but not exactly equivalent to, lines of contact 8a and 8b shown in FIG. 2A. Lines 106a and 106b intersect at an intersection 19, and a distance h is the distance between intersection 19 and the active surface of probe 10. A displacement q(θ) is the sum of displacement measurement m(θ) and distance h, and corresponds to the distance from intersection 19 to the surface of tube 4.

In order to determine diameter $D_1$, displacement q(e) must be determined for all values of angle θ from 0 to 2π. It should be noted that distance h has no effect on the roundness measurement, but it does influence measurement of average circle diameter $D_1$. The value of distance h is not precisely known in practice. However by using a calibration block having the nominal tube diameter, an accurate measurement of average circle diameter $D_1$ may be made. The principle of the calibration is disclosed below with reference to equations (7), (8) and (9).

Displacement measurement q(θ) can be related with roundness profile s(θ) and the weighted roundness profile at the position of the two points of contact, s(θ−α) and s(θ+α), using the following equation:

$$q(\theta) = s(\theta) - \frac{s(\theta - \alpha) + s(\theta + \alpha)}{2\cos\alpha} \quad (1)$$

Figure 3:
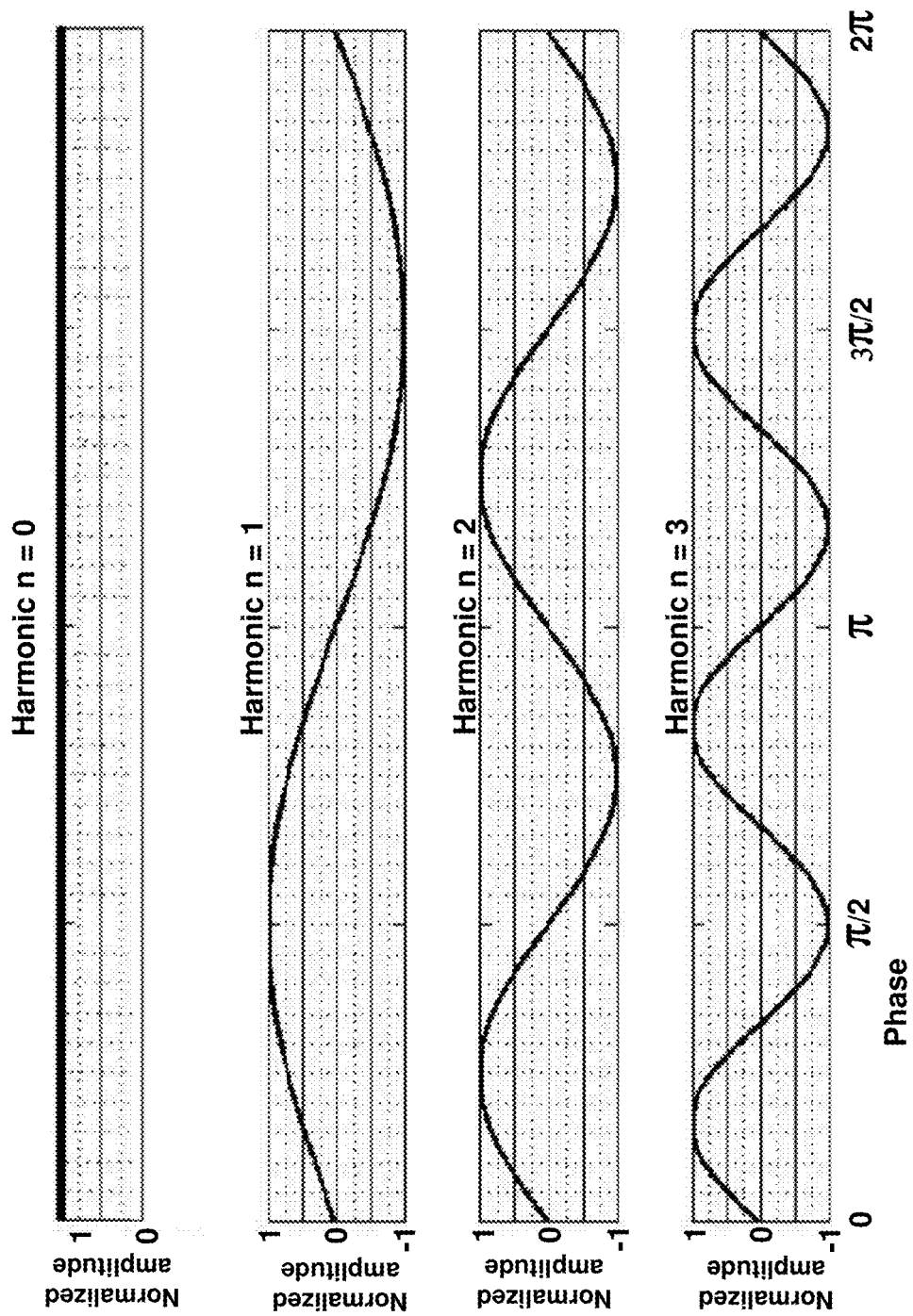
FIG. 3 shows a phase representation of the amplitude of undulations for the first 4 harmonics, n=0, 1, 2, and 3.

The functions q(θ) and s(θ) can be represented by a sum of Fourier components Q(n) and S(n), where n takes integer values known as harmonics, each harmonic representing the number of undulations per revolution of tube 4. FIG. 3 is a phase representation of the normalized amplitude of undulations for the first four harmonics, n=0, 1, 2 and 3. For simplicity in each case the initial phase is set to 0.

Figure 4:
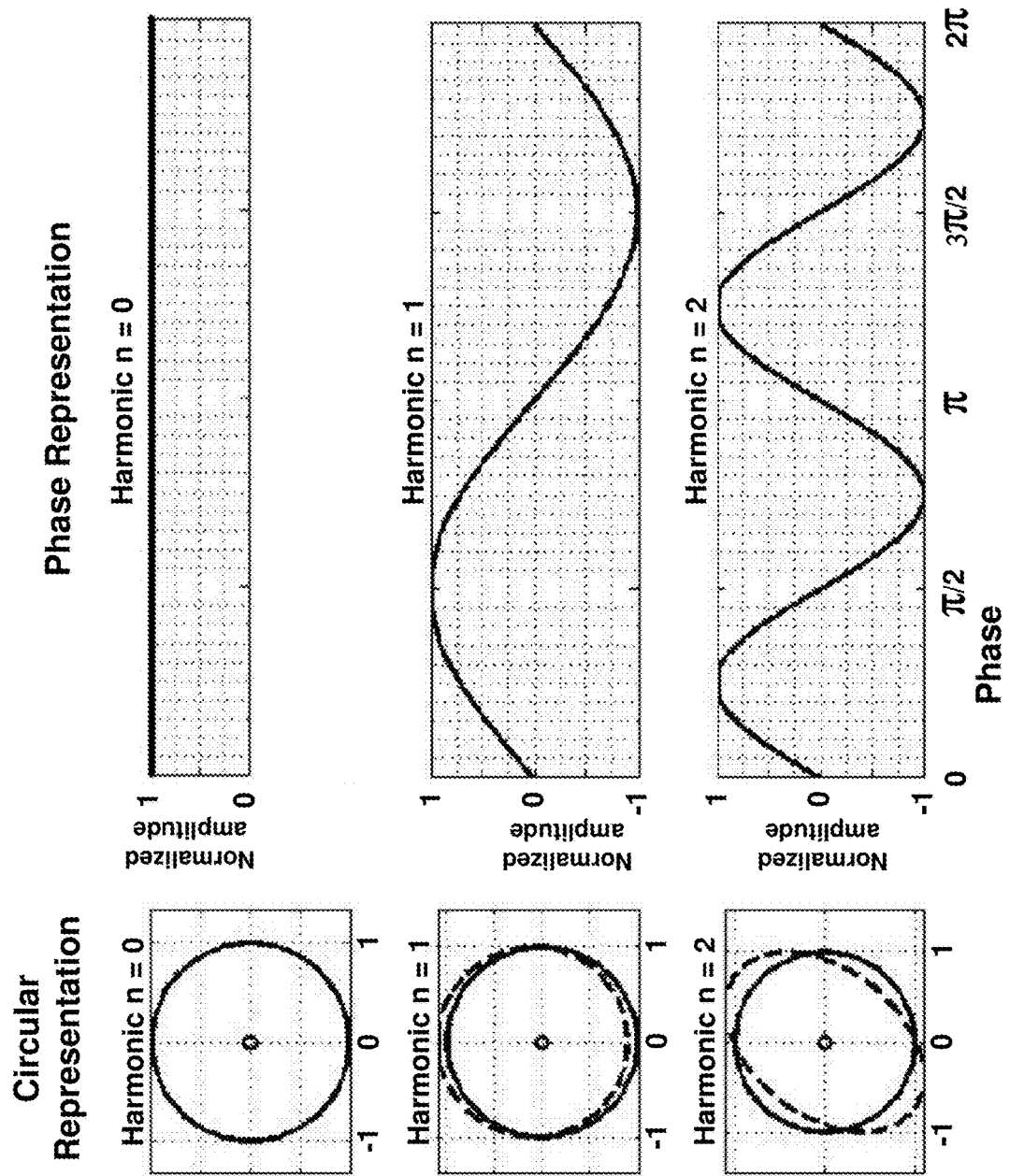
FIG. 4 shows a phase representation of the amplitude of undulations for the first 3 harmonics, n=0, 1, and 2, together with circular geometric representations of the tube profiles corresponding to each harmonic.

FIG. 4 shows the phase representation of the first three harmonics, n=0, 1, and 2, together with circular geometric representations of the tube profiles corresponding to each harmonic. In the circular representations, the circles with solid lines are representations of average circle 2, while figures with broken lines represent profiles of actual tube 4.

The first harmonic (n=0) corresponds to a perfect circle for which the amplitude is a constant value and the deviation s(θ) from roundness is zero all around the tube. The second harmonic (n=1) corresponds to a perfect circle which is not centered with respect to the axis of rotation. The dotted circle in the circular representation of harmonic n=1 shows an offset of tube 4 in the Y axis. The third harmonic (n=2) corresponds to tube 4 having an elliptical (oval) cross-section. The dotted ellipse in the circular representation of harmonic n=2 is centered with respect to the average circle 2. Higher harmonics (n>2) (not shown in FIG. 4) represent higher order variations in s(θ), representing roundness deviations which are non-oval.

Using the Fourier components Q(n) and S(n), for n=0, 2, . . . N, where N is the highest harmonic number, a harmonic sensitivity G (n) can be defined as:

$$G(n) = \frac{Q(n)}{S(n)} \quad (2)$$

where G (n) is the sensitivity of probe measurement Q (n) to the tube profile variation S(n) for the $n^{th}$ harmonic. G (n) is given by:

$$G(n) = 1 - \frac{\cos n\alpha}{\cos\alpha} \quad (3)$$

Therefore:

$$S(n) = \frac{Q(n)}{G(n)} = \frac{Q(n)}{1 - \frac{\cos(n\alpha)}{\cos\alpha}} \quad (4)$$

Note that since Q(n) is generally a complex number, S(n) is a complex number in phase with Q(n).

In order to calculate Q (n), a series of ultrasonic measurements q(k) is made as tube 4 is rotated (θ varies from 0 to 2π), where k is the sampling number and θ=kδθ, where δθ is the angular increment between samples. Q(n) is then derived as $$Q(n) = FFT\{q(k)\} \quad (5)$$

for k=1, 2, . . . K, where K is the number of samples in one revolution of the tube, and where FFT{q(k)} is the Fast Fourier Transform (FFT) of the measurements q(k). The harmonics S(n) may then be calculated from equations (4) and (5), and finally the roundness profile of tube 4 is obtained using the Inverse Fast Fourier Transform of all harmonics S(n):

$$s(k) = FFT^{-1}\{S(n)\} \quad (6)$$

where $FFT^{-1}\{S(n)\}$ is the Inverse Fast Fourier Transform of S(n).

Note that not all harmonics can be used because those harmonics for which G (n) is very small may make the calculation unstable in the presence of signal noise. In particular, the second harmonic (n=1) cannot be used because G(1) is zero (see equation (3)). However, the second harmonic represents the displacement of tube 4 from the center of the nominal circle, which is not important for determination of roundness and average diameter. To avoid the problem of zero sensitivity for the second harmonic, the sensitivity for n=1 is set to $$\frac{1}{G(1)} = 0 \quad (1)$$

for the Fourier Transform calculation.

In general, in order to obtain a precise profile of the outside surface of tube 4, it is necessary to have a large number of samples, meaning a small angular increment δθ between samples. It is also necessary to avoid harmonics n for which sensitivity factor G(n) is small or zero. This may be achieved by careful selection of the angle α subtended by lines of contact 8a and 8b with respect to the direction of ultrasonic beam 12. In an embodiment, α may be equal to 48°. In a second embodiment, α may be equal to 42°. However any other value of α may be advantageous, and all such values are within the scope of the present disclosure.

In order to avoid instabilities due to harmonics having small or zero sensitivity factor G(n), 1/G(n) may be set to zero for the Fourier Transform calculation for all values of G(n) less than a lower sensitivity limit. In an embodiment, the lower sensitivity limit may be 0.3, but other values of the lower sensitivity limit are possible, and all such values are within the scope of the present disclosure.

The Fourier Transform calculation may be performed for harmonics n=0, 1, 2, . . . N, where N is the highest order harmonic allowed by the system design. For example, if G(n)>0.3, then according to Eq. 3, 1−cos(nα)/cos(α)>0.3. This relationship may be satisfied for some combinations of α and N. In general, the value of N should be as large as possible, and in any event should be greater than or equal to 6. Another design factor to consider is the size of the measuring mechanism. The larger the value of angle α, the larger the size of the measuring mechanism. Therefore there is a compromise between the size of the mechanism and the highest achievable harmonic number N. In an embodiment, with α=48°, the highest order harmonic may be N=13, but other values of the highest order harmonic are possible, and all such values are within the scope of the present disclosure.

Figure 5A:
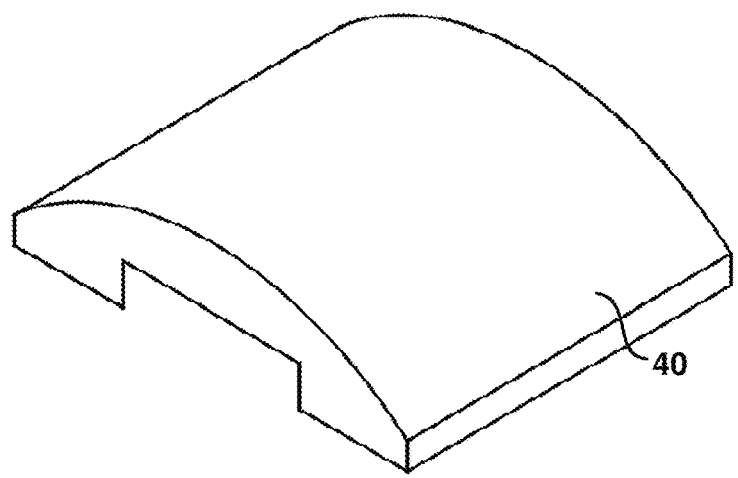
FIG. 5A is a diagram of a calibration block according to the present disclosure.
Figure 5B:
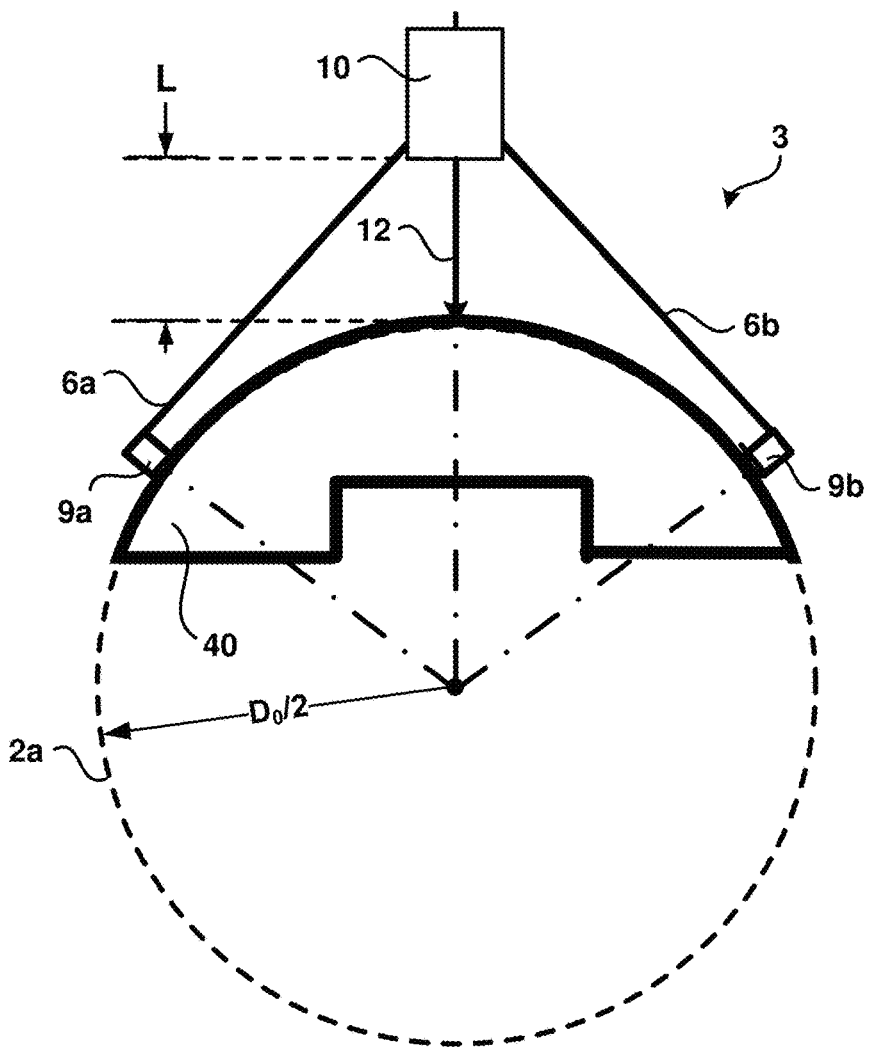
FIG. 5B is a schematic representation of a calibration system according to the present disclosure.

It is important to note that the distances, S(n), Q(n), s(k) and q(k), and the angle α, are all referenced to the diameter $D_1$ of average circle 2. With the assumption that the deviations from average circle 2 are small, only the first harmonic n=0 corresponds to the diameter of average circle 2. However, the diameter of average circle 2 cannot be accurately measured with test measurement system 1 because the exact length of the couplant column between probe 10 and the surface of tube 4 is difficult to measure, and the distance h (see FIG. 2B) is unknown. The inventors of the present disclosure have discovered that the accuracy of the average diameter measurement can be significantly improved by performing a calibration with a calibration system 3 using a calibration block as shown in FIGS. 5A and 5B. Calibration block 40 is configured to allow stable and repeatable location on calibration block 40 of the measurement system comprising probe support frames 6a and 6b and contact bars 9a and 9b. Calibration block 40 is further configured so that when the measurement system is located on calibration block 40, the acoustic path length from probe 10 to the surface of calibration block 40 accurately corresponds to a length L, wherein length L is the acoustic path length from probe 10 to a nominal circle 2a having a nominal diameter Do (see FIG. 5B). Note that nominal circle 2a, as defined by the geometry of calibration system 3, represents the nominal diameter of tube 4. However, nominal diameter Do may be different from average diameter $D_1$, which is the average tube diameter as measured with test measurement system 1. As illustrated in FIG. 5B, calibration block 40 has a cross-section which is part of nominal circle 2a. However, those skilled in the art may devise various forms and constructions of calibration block 40 in which the acoustic path length from probe 10 to the surface of calibration block accurately corresponds to the length L, and all such forms and constructions are within the scope of the present disclosure.

Calibration according to the present disclosure is performed by measuring a calibration time of flight in couplant fluid 16 when probe 10 is coupled to calibration block Note that calibration block 40 is not rotated during the calibration measurement. Probe is then coupled to tube 4 which is rotated, and the measured average diameter $D_1$ (first harmonic) is compensated according to the calibration time of flight. The calibration allows an accurate measurement of the first harmonic n=0 corresponding to the actual average diameter $D_1$ of tube 4. The method of compensating the first harmonic according to the calibration time of flight is described below in connection with FIG. 7 and equations (7)-(11).

Figure 6A:
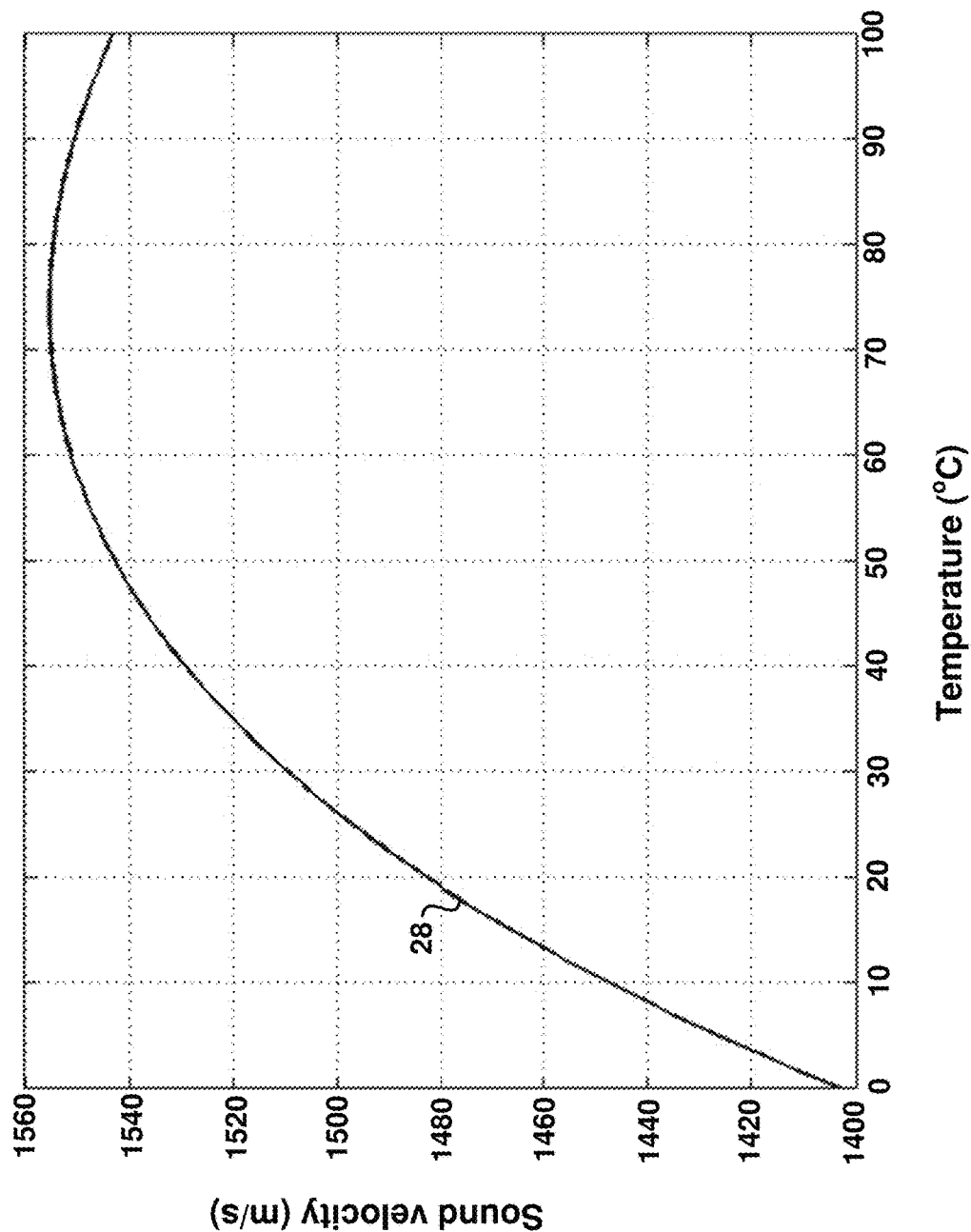
FIG. 6A is a graph showing the temperature dependence of sound velocity in water.
Figure 6B:
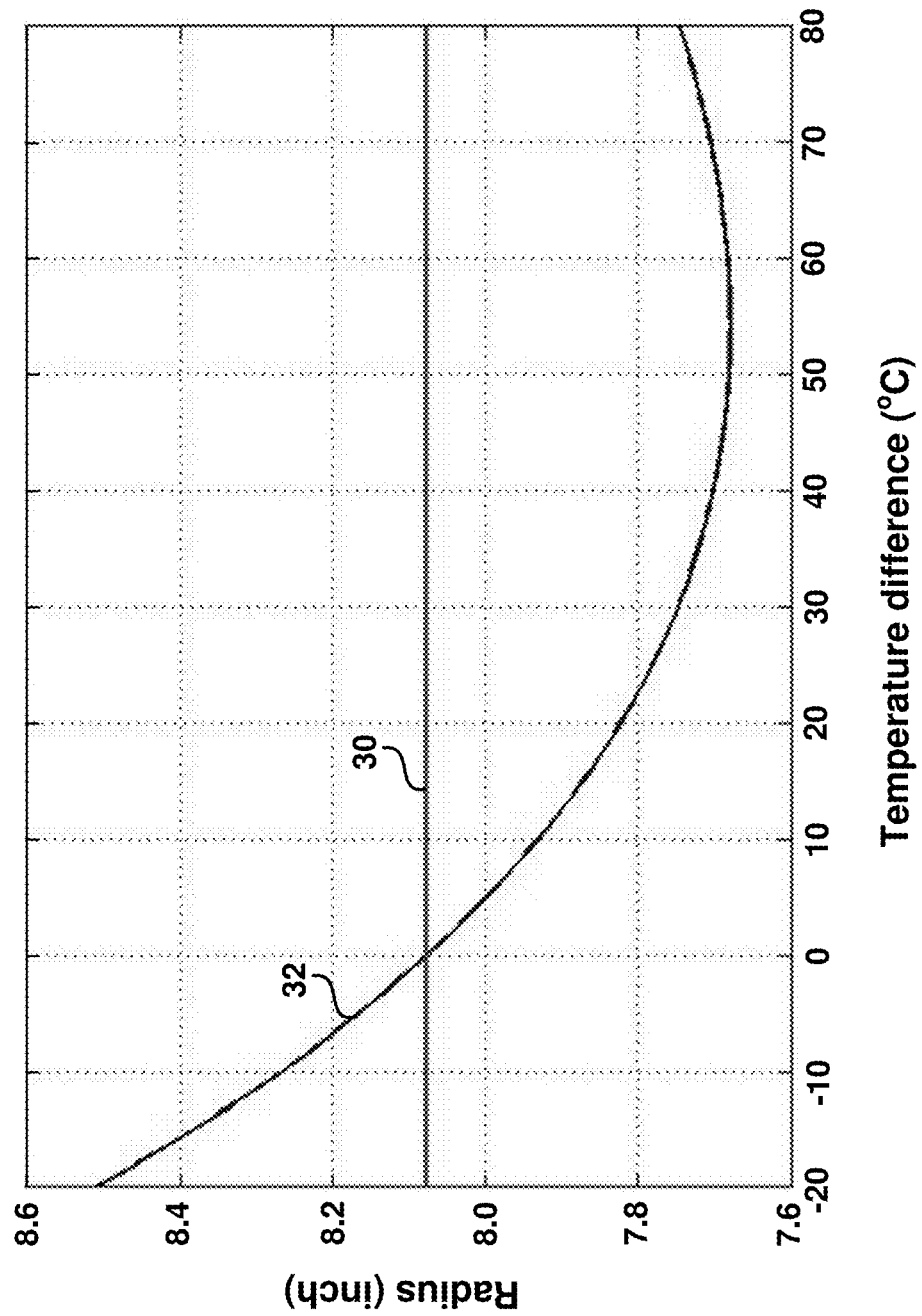
FIG. 6B is a graph showing the dependence of measured tube radius on the water temperature difference between calibration and measurement.

The inventors of the present disclosure have observed that compensation of the first harmonic may be inaccurate if the temperature of couplant fluid 16 during calibration with calibration system 3 differs from the temperature of couplant fluid 16 during the measurement with test measurement system 1. FIG. 6A shows a curve 28 representing the dependence of sound velocity in water on the temperature of the water. Curve 28 is well known in the art. FIG. 6B shows calculations of the radius of average circle 2 obtained from the calibrated first harmonic when measuring a tube having a nominal radius of 8.075 inches. A line 30 shows the calibrated radius of average circle 2 when the water temperature is 20° C. for both the calibration and the measurement. A curve 32 shows the calculated radius of average circle 2 as a function of the temperature difference between the calibration temperature at 20° C. and the measurement temperature. It may be seen from FIG. 6B that a 5° C. difference in water temperature causes an error of approximately 1% in the calculated radius. In the method of the present disclosure, this error is substantially eliminated by measuring the water temperature during calibration and during measurement, and using the velocity dependence of curve 28 (FIG. 6A) to correctly convert the time of flight measurements to displacement measurements (see equations (7), (8) and (9) below). Note that only the first harmonic is corrected for couplant temperature. Correction of higher harmonics is not required.

Figure 7:
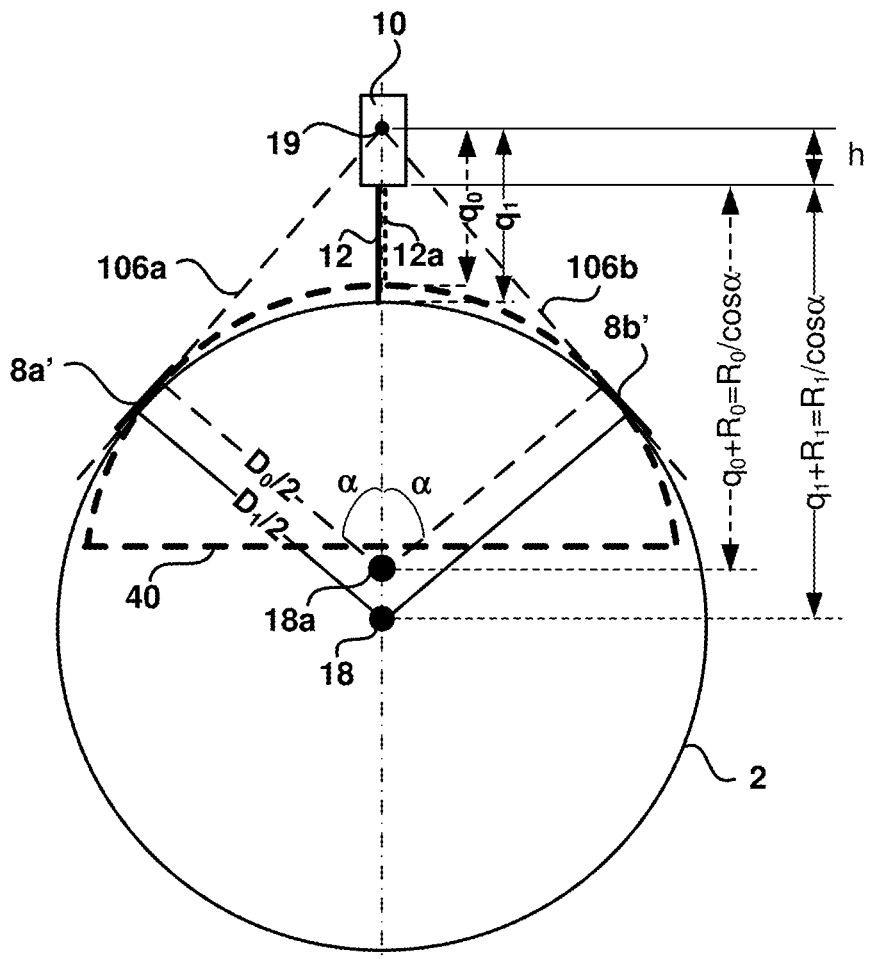
FIG. 7 is a diagram illustrating the principle of compensation of the measurement of the average diameter.

FIG. 7 illustrates the principle of compensation of the measurement of the first harmonic n=0 with calibration block 40. FIG. 7 shows a superposition of measurement parameters for calibration with calibration block 40 (having diameter $D_0$ and radius $R_0$) and subsequent measurement of tube 4 (having average diameter $D_1$ and average radius $R_1$). In FIG. 7, line 106a is tangential at line of contact 8a' to both average circle 2 and calibration block 40, and a line 106b is tangential at line of contact 8b' to both average circle 2 and calibration block 40. Note that axis 18 of average circle 2 may not coincide with the corresponding axis 18a of calibration block 40. Distances $q_0$ and $q_1$ are measured from intersection 19 to average circle 2 and calibration block 40 respectively. Therefore, the distance $q_0$–h represents a sound path 12a from the active surface of probe 10 to the surface of calibration block 40, and the distance $q_1$–h represents the sound path 12 from the active surface of probe 10 to the surface of tube 4. Sound paths 12 and 12a, and the difference Δq between them, can be calculated with equations (7), (8) and (9) below:

$$q_0 - h = TOF_0 \times V_0 / 2 \quad (7)$$

$$q_1 - h = TOF_1 \times V_1 / 2 \quad (8)$$

$$\Delta q = q_1 - q_0 = (TOF_1 \times V_1 - TOF_0 \times V_0)/2 \quad (9)$$

where $TOF_0$ is the complete time of flight in the sound path $q_0$-h, $TOF_1$ is the complete time of flight in the sound path $q_1$-h, wherein $TOF_1$ is derived as the average time of flight measured during a complete rotation of tube 4, $V_0$ is the sound velocity in couplant fluid 16 during calibration with calibration block 40, and $V_1$ is the sound velocity in couplant fluid 16 during measurement of tube 4. Note that $V_0$ and $V_1$ may be different because the temperature of couplant fluid 16 may be different for the two measurements. The following equation may be derived from the geometrical relationships shown in FIG. 7:

$$D_1 = 2\Delta q \frac{\cos\alpha}{1 - \cos\alpha} + D_0, \quad (10)$$

where $D_0$ is the diameter of calibration block 40 (corresponding to the nominal diameter of tube 4) and $D_1$ is the average diameter of tube 4 (corresponding to the first harmonic n=0 that needs to be compensated).

Note that in equations (9) and (10) the dependence on unknown distance h has been eliminated, allowing an accurate determination of average diameter $D_1$.

From Equations (9) and (10), the following final expression is derived:

$$D_1 = (TOF_1 \times V_1 - TOF_0 \times V_0)\frac{\cos\alpha}{1 - \cos\alpha} + D_0 \quad (11)$$

Equation (11) allows calibration of the measurement of average diameter $D_1$ by using calibration block 40 and taking into account the effect of temperature change.

Figure 8:
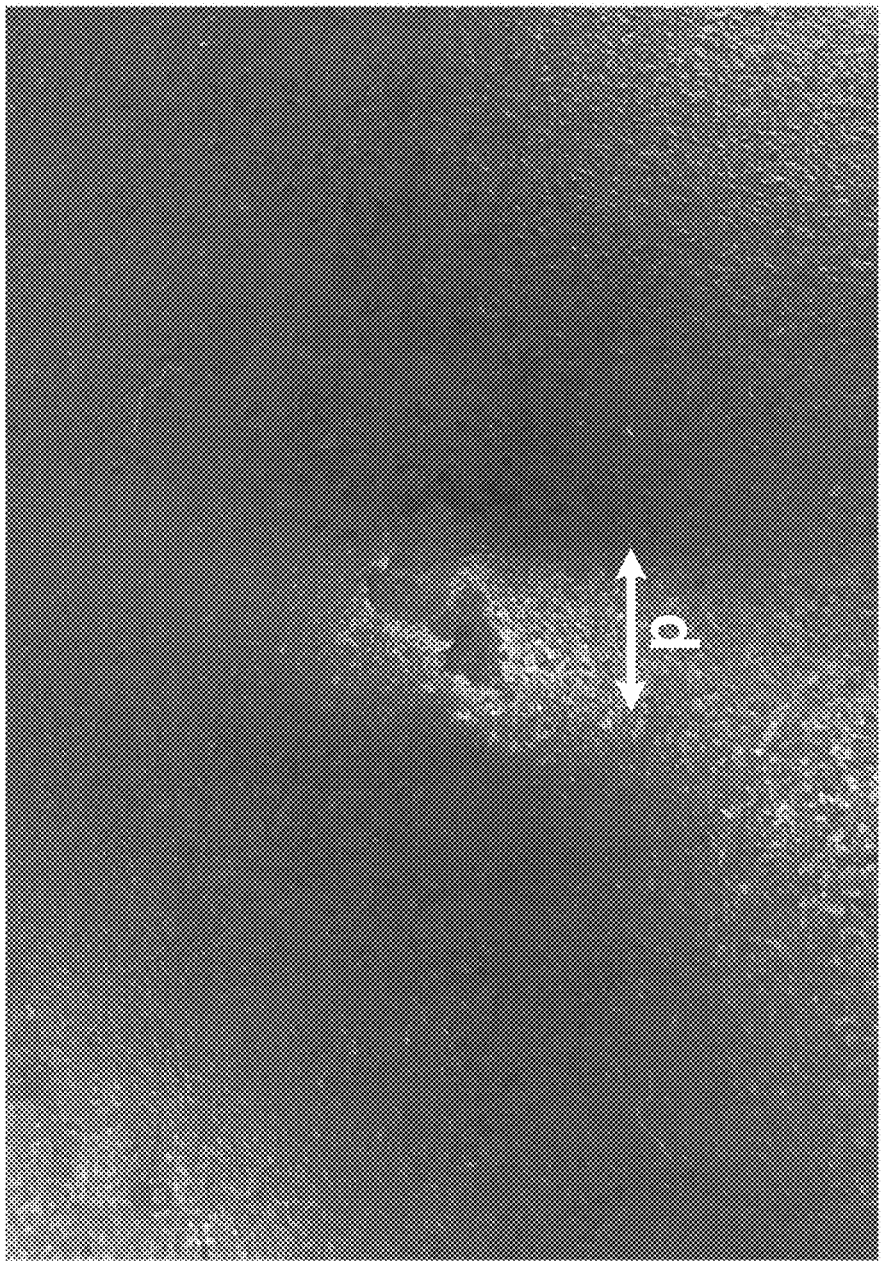
FIG. 8 is a photograph of a representative pit on a tube surface.

It should be noted that the equipment and methods of the present disclosure are generally applied to tubes having substantial axial length, and that the average diameter and roundness profile should therefore be measured as a function of axial position. Such measurements may be made by axially translating tube 4 during the measurement and/or by axially scanning ultrasonic beam 12 from ultrasonic probe 10, wherein probe 10 is configured as a linear array probe. In making such measurements, it is assumed that the average diameter and roundness profile of the tube change slowly in the axial direction relative to the axial lengths of ultrasonic probe 10 and contact bars 9a and 9b. While this assumption is generally true, errors can occur if there are small pits in the surface of tube 4. FIG. 8 is a photograph of a surface pit which is typically a result of the method of production of the tube. The dimension p representing the axial length of the pit is typically 1 to 10 mm. The depth of a pit is typically 1 to 3 mm.

Figure 9:
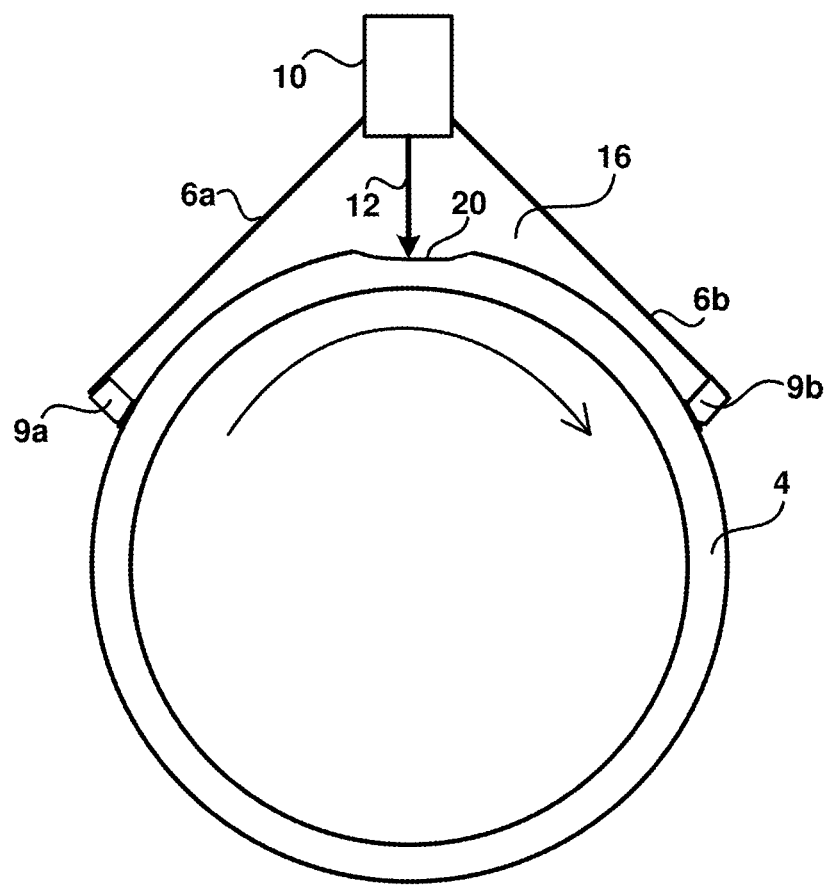
FIG. 9 is a schematic representation of a measurement system showing the effect of a pit in the tube surface.

FIG. 9 illustrates a situation where the outside surface of tube 4 has a pit 20 whose dimension in the axial direction is less than the axial length of probe 10 and contact bars 9a and 9b. As illustrated in FIG. 9, when tube 4 is rotated so that pit 20 is under ultrasonic beam 12, ultrasonic beam 12 may be sufficiently focused to probe the depth of pit 20. However, when tube 4 rotates so that pit 20 is under either contact bar 9a or contact bar 9b, the contact bar, being axially longer than pit 20, will ride over pit 20 and the contact bar radial position will be unaffected by pit 20. This situation violates the three point contact assumption inherent in equation (1), and therefore diameter $D_1$ of average circle 2 will be overestimated at the axial location of pit 20.

Figure 10:
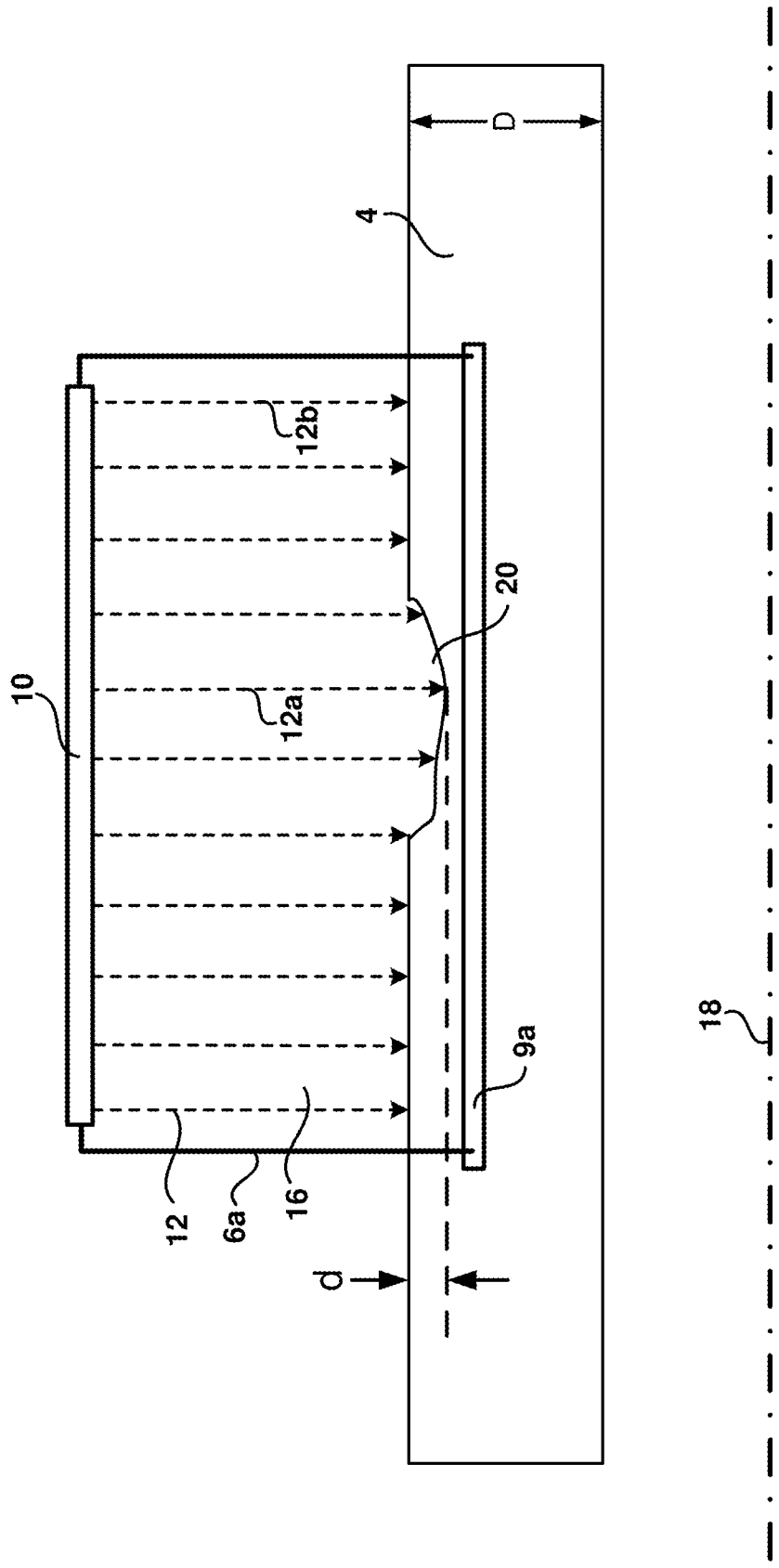
FIG. 10 is a side view of a measurement system in the presence of a pit.

FIG. 10 shows a side view of tube 4, ultrasonic probe 10, support frame 6a and contact bar 9a. Ultrasonic probe 10 is longer in the axial direction than pit 20, and emits multiple ultrasonic beams 12, some of which probe the depth of pit 20 and others do not. Among ultrasonic beams 12 there is an ultrasonic beam 12a which probes a maximum depth d of pit 20 and which therefore has a maximum time of flight $t_{max}$ between probe 10 and tube 4. Also among ultrasonic beams 12 there is an ultrasonic beam 12b which does not probe pit 20 and which has a minimum time of flight $t_{min}$ between probe 10 and tube 4. Note that under the assumption that the roundness profile varies slowly in the axial direction, there will be multiple beams 12b having substantially the same minimum time of flight, corresponding to all those beams 12 which do not probe pit 20. Furthermore, under the assumption that the roundness profile varies slowly in the axial direction, the time of flight of those beams 12, such as beam 12a, which do probe pit 20, may be replaced by minimum time of flight $t_{min}$ in order to obtain a reconstructed surface profile $rsp(\theta)$ which represents the profile of tube 4 in the absence of pit 20.

In summary, roundness calculation errors due to the presence of pit 20 may be corrected by using a linear array probe 10 emitting multiple ultrasonic beams 12, determining a minimum time of flight of ultrasonic beams 12, and calculating displacement measurement $q(\theta)$ based on the minimum time of flight for all axial positions along the length of probe 10.

As an alternative to using a linear probe array, a single probe or a single aperture of a probe array may be used in conjunction with a helicoidal scan, in which case the times of flight of many adjacent scans may be axially compared and the minimum time of flight used to calculate displacement measurement $q(\theta)$. The pitch of the helicoidal scan should be less than half the axial dimension of a typical pit in tube 4.

Figure 11:
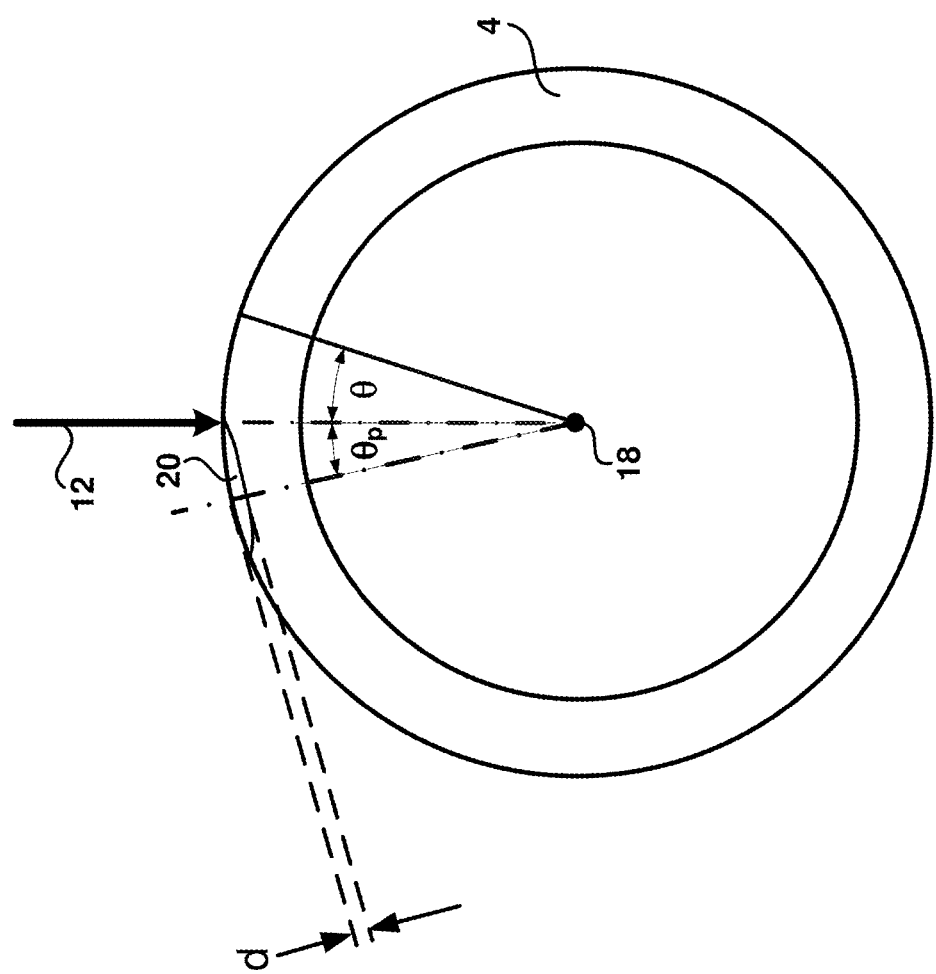
FIG. 11 is an illustration of geometry for measuring the depth of a pit.

FIG. 11 illustrates how the depth profile of the pit may be determined as tube 4 is rotated. A true tube surface profile $tsp(\theta)$ at each axial location, which takes the pit profile into account, may then be calculated from the equation:

$$tsp(\theta) = rsp(\theta) - V_1[t(\theta) - t_{min}(\theta)] \quad (12)$$

wherein $tsp(\theta)$ is the radius of the true surface profile, $rsp(\theta)$ is the radius of the reconstructed surface profile, $V_1$ is the acoustic velocity in couplant 16, $t(\theta)$ is the time of flight corresponding to an aperture at the axial location, and $t_{min}(\theta)$ is the minimum time of flight corresponding to beam 12b measured by linear probe 10 at angle $\theta$.

As shown in FIG. 11, the maximum depth d of pit 20 will be measured at an angle $\theta_p$, wherein $t(\theta_p) = t_{max}$. In equation (12), variation of $V_1$ with temperature is not important since very accurate measurement of profile $tsp(\theta)$ is not required.

Note that FIG. 10 illustrates the thickness D of tube 4, which may be measured as a function of angle $\theta$ and axial position by means of the time of flight difference between ultrasonic beams 12 reflected from the outer surface of tube 4 and those reflected from inner surface of tube 4 (not shown), and with knowledge of the acoustic velocity in the material of tube 4. Thus, use of the ultrasonic method has the advantage that both the roundness and the tube thickness may be measured.

Figure 12:
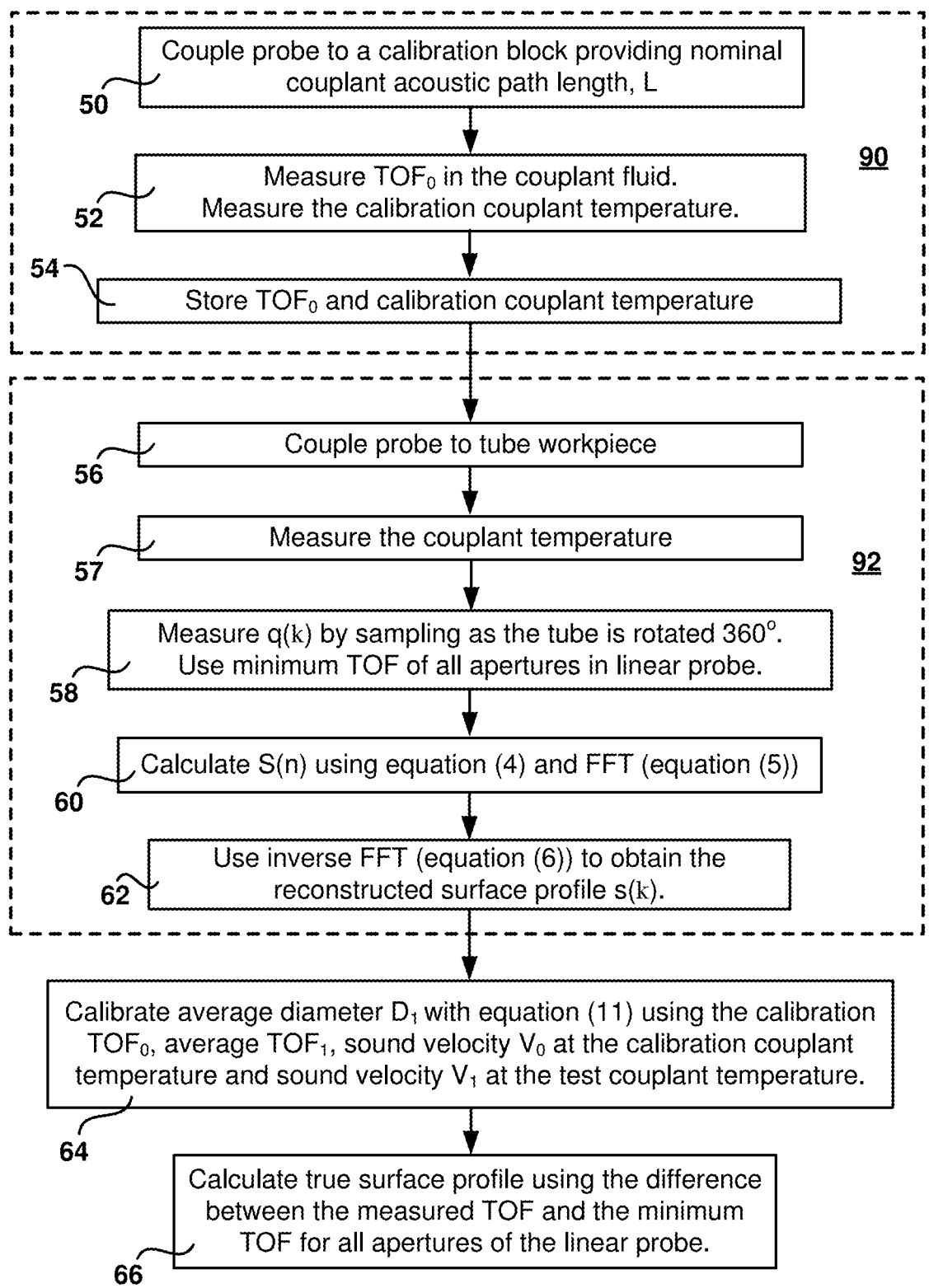
FIG. 12 is a flowchart of a method of measuring a roundness profile and an average diameter of a tube according to the present disclosure.
Figure 13:
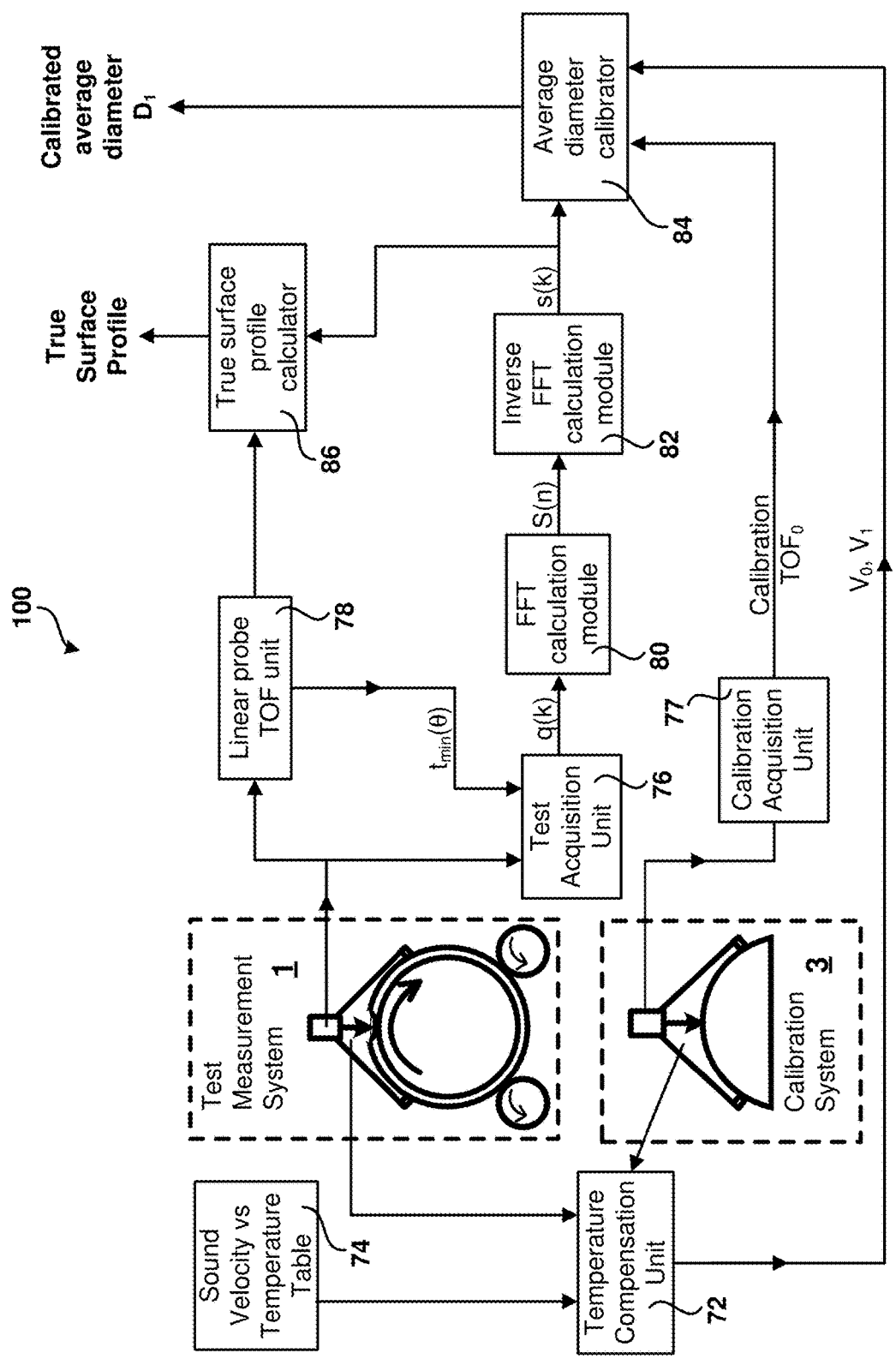
FIG. 13 is a schematic representation of a measurement system for measuring a roundness profile and an average diameter of a tube according to the present disclosure.

FIG. 12 is a flowchart of a method of measuring the roundness profile and average diameter of a tube according to the present disclosure. Steps 50, 52 and 54 are the steps of a calibration mode 90. In step 50, probe 10 is coupled to calibration block 40 so that the acoustic path length in couplant 16 between probe 10 and calibration block 40 is equal to the nominal acoustic path length L between probe 10 and nominal circle 2a. In step 52, calibration time of flight $TOF_0$ is measured between probe 10 and the surface of calibration block 40, and the temperature of couplant 16 is measured at the time of calibration. In step 54, the calibration time of flight and couplant temperature are stored for use in subsequent test measurements.

A test mode measurement 92 on a tube workpiece begins at step 56, in which probe is coupled to tube 4. In step 57 the couplant temperature for the test mode measurement is measured and stored. In step 58, a series of ultrasonic measurements $q(k)$ is made as tube 4 is rotated 360°. The measurements are made as a function of axial position with linear probe 10 having its axis parallel to the axis of tube 4, and for each axial position $q(k)$ is derived from the minimum time of flight $t_{min}$ of all apertures of probe 10. In step 60, the $n^{th}$ harmonics $Q(n)$ are derived from the Fast Fourier Transform of $q(k)$, and the corresponding harmonics of the tube profile, $S(n)$, are then calculated from equation (4). In step 62, the inverse FFT is applied to $S(n)$ to derive the reconstructed surface profile $s(k)$ of tube 4, which is the profile in the absence of surface pits.

Steps 64 and 66 are steps of calibration and of corrections applied to $s(k)$ to account for temperature differences and the presence of pits. In step 64, the average tube diameter $D_1$ is calculated and temperature compensated in accordance with equation (11), using the calibration time of flight $TOF_0$, the average time of flight $TOF_1$, and the different sound velocities at the test couplant temperature and the calibration couplant temperature. In step 66, the true surface profile, taking into account the presence of pits, is calculated from equation (12) based on the difference between the measured TOF at each angle and axial position, and the minimum TOF at that angle for all apertures of linear probe 10.

FIG. 8 is a schematic representation of a measurement system 100 for measuring the roundness profile and average diameter of a tube according to the present disclosure. Measurement system 100 comprises calibration system 3 with probe 10 coupled to calibration block 40. A calibration acquisition unit 77 acquires ultrasound signals from probe 10 and transmits calibration TOE) to an average diameter calibrator 84. A temperature compensation unit 72 obtains a calibration couplant temperature measurement of couplant 16 during the calibration measurement, and outputs a calibration sound velocity $V_0$ with input from a sound velocity vs temperature table 74.

Measurement system 100 further comprises test measurement system 1, which is deployed subsequent to the calibration measurement, and from which linear probe 10 transmits data to a test acquisition unit 76 and to a linear probe TOF unit 78. Linear probe TOF unit 78 determines times of flight for all apertures of linear probe 10 and transmits minimum TOF, $t_{min}(\theta)$, to test acquisition unit 76. Temperature compensation unit 72 obtains a test couplant temperature measurement of couplant 16 during the test measurement, and outputs a test sound velocity $V_1$ with input from sound velocity vs temperature table 74. Test acquisition unit 76 acquires a series of ultrasonic measurements q(k) as tube 4 is rotated 360°, the values of q(k) being based on the minimum TOF, $t_{min}(\theta)$, for all axial positions along the length of probe 10. A FFT calculation module 80 then performs a Fast Fourier Transform to obtain the harmonics S(n) of the profile of tube 4, and an Inverse FFT calculation module 82 performs an Inverse Fast Fourier Transform to obtain the reconstructed surface profile s(k) of tube 4, which is the profile in the absence of surface pits. With input from linear probe TOF unit 78, a true surface profile calculator 86 uses equation (12) to produce the true surface profile, which is the surface profile of tube 4 taking into account the presence of pits.

An average diameter calibrator 84 calibrates the average diameter $D_1$ (the first harmonic of s(k)) by means of equation (11), using calibration TOE) from calibration system 3 and calibration and test sound velocities $V_0$ and $V_1$ from temperature compensation unit 72.

Therefore the output from measurement system 100 is the true surface profile and calibrated average diameter $D_1$.

Although the present invention has been described in relation to particular embodiments thereof, it can be appreciated that various designs can be conceived based on the teachings of the present disclosure, and all are within the scope of the present disclosure.

What is claimed is:

1. A method of measuring a tube, the method comprising:
    acoustically coupling an ultrasonic probe to a tube outer surface, the probe configured to emit an ultrasonic beam and to receive a response signal;
    determining respective ultrasonic time of flight measurements at different angular positions of the tube relative to the probe, using corresponding ultrasonic beam and response signal;
    determining a series of respective distances corresponding to the time of flight measurements;
    transforming the series of respective distances into a spatial frequency domain; and
    determining an average diameter of the tube outer surface using an inverse transform of a spatial frequency domain representation of the respective distances corresponding to a specified harmonic, the determining the average diameter including compensating for a couplant temperature of a couplant used to acoustically couple the ultrasonic probe to the tube outer surface.

2. The method of claim 1, comprising measuring the couplant temperature of the couplant used to acoustically couple the ultrasonic probe to the tube outer surface.

3. The method of claim 2, comprising measuring a calibration time of flight in a calibration mode wherein the probe is coupled to a calibration block with a calibration couplant and having an associated calibration couplant temperature; and
    wherein determining an average diameter of the tube outer surface includes compensating for the couplant temperature of the couplant used to acoustically couple the ultrasonic probe to the tube outer surface using the calibration couplant temperature and calibration time of flight.

4. The method of claim 3, wherein the calibration mode comprises:
    acoustically coupling the probe to the calibration block with the calibration couplant to establish a calibration beam path between the probe and the calibration block surface corresponding to a nominal tube diameter;
    determining the calibration time of flight;
    measuring the calibration couplant temperature; and
    determining a calibration couplant sound velocity from a known couplant material sound velocity temperature dependence.

5. The method of claim 1, wherein the specified harmonic is a zeroth-order harmonic; and
    wherein the method comprises determining a roundness profile defined as a deviation of a tube outer surface profile from a circle defined by the determined average diameter, the deviation being determined as a function of angular positions of the tube relative to the probe.

6. The method of claim 5, wherein determining the roundness profile includes correcting an average diameter determination corresponding to the zeroth-order harmonic using an average diameter determination corresponding to a time-of-flight measurement performed on a calibration block corresponding to a nominal tube diameter.

7. The method of claim 5, wherein determining a series of respective distances corresponding to the time of flight measurements includes suppressing a contribution from a pit located on the tube by determining the roundness profile using respective minimum aperture times of flight at different axial positions of the ultrasonic probe relative to the tube.

8. The method of claim 5, wherein the ultrasonic probe comprises a linear probe having a plurality of elements configured as a plurality of transmission apertures and having a linear probe direction with a linear probe length oriented substantially parallel to an axial direction of the tube;
    wherein the plurality of transmission apertures are controlled to measure a plurality of aperture times of flight between respective apertures and the tube outer surface; and
    wherein the method comprises establishing a minimum aperture time of flight amongst the plurality of aperture times of flight, with the minimum aperture time of flight determined for respective different angular positions.

9. The method of claim 8, comprising suppressing a contribution from a pit located on the tube by determining the roundness profile using the respective minimum aperture times of flight.

10. The method of claim 9, wherein the linear probe length is greater than a pit axial length.

11. The method of claim 1 wherein the probe is supported by a first support frame connected to a first contact bar and a second support frame connected to a second contact bar; and
wherein the first contact bar and the second contact bar are in contact with the tube outer surface.

12. The method of claim 11, wherein the tube outer surface has at least one surface pit thereon, the surface pit having a pit axial length, wherein the first contact bar has a bar axial length and the second contact bar has the bar axial length, and wherein the bar axial length is greater than the pit axial length.

13. The method of claim 1, comprising causing relative rotation between the tube and the probe, the rotation being about a tube axis oriented along a tube axial direction.

14. The method of claim 13, wherein causing relative rotation includes translating the tube in an axial direction to establish a helicoidal tube scan.

15. The method of claim 1, wherein the couplant comprises water.

16. A method of measuring a tube, the method comprising:
acoustically coupling an ultrasonic probe to a tube outer surface, the probe configured to emit an ultrasonic beam and to receive a response signal;
causing relative rotation between the tube and the probe, the rotation being about a tube axis oriented along a tube axial direction;
determining respective ultrasonic time of flight measurements at different angular positions of the tube relative to the probe, using corresponding ultrasonic beam and response signal;
determining a series of respective distances corresponding to the time of flight measurements;
transforming the series of respective distances into a spatial frequency domain; and
determining a roundness profile of the tube outer surface using an inverse transform of a spatial frequency domain representation of the respective distances corresponding to a specified harmonic, the determining the roundness profile including compensating for a couplant temperature of a couplant used to acoustically couple the ultrasonic probe to the tube outer surface;
wherein the ultrasonic probe comprises a linear probe having a plurality of elements configured as a plurality of transmission apertures and having a linear probe direction with a linear probe length oriented substantially parallel to the axial direction of the tube;
wherein the plurality of transmission apertures are controlled to measure a plurality of aperture times of flight between respective apertures and the tube outer surface to provide the series of respective distances.

17. The method of claim 16, comprising establishing a minimum aperture time of flight amongst the plurality of aperture times of flight, for respective different angular positions, including suppressing a contribution from a pit located on the tube by determining the roundness profile using the respective minimum aperture times of flight.

18. The method of claim 17, wherein the probe is supported by a first support frame connected to a first contact bar and a second support frame connected to a second contact bar; and
wherein the first contact bar and the second contact bar are in contact with the tube outer surface.

19. The method of claim 18, wherein the tube outer surface has at least one surface pit thereon, the surface pit having a pit axial length, wherein the first contact bar has a bar axial length and the second contact bar has the bar axial length, and wherein the bar axial length is greater than the pit axial length and the linear probe length is greater than the pit axial length.

20. A measurement apparatus for measuring a tube having a tube outer surface, the apparatus comprising:
at least one ultrasonic probe configured to emit an ultrasonic beam and to receive a response signal;
a measurement assembly configured to be mounted on the tube outer surface, to hold the probe and to cause a relative rotation between the probe and the tube outer surface, the rotation being about a tube axis for determination of a series of respective distances corresponding to the time of flight measurements by a test acquisition unit in communication with the at least one ultrasonic probe;
a Fourier transform calculation circuit configured to transform the series of respective distances into a spatial frequency domain; and
an inverse Fourier transform calculation circuit communicatively coupled with an average diameter calibrator for determining an average diameter of the tube outer surface using an inverse transform of a spatial frequency domain representation of the respective distances corresponding to a specified harmonic, the determining the average diameter including compensating for a couplant temperature of a couplant used to acoustically couple the ultrasonic probe to the tube outer surface.

21. The measurement apparatus of claim 20, wherein probe is supported by a first support frame connected to a first contact bar and a second support frame connected to a second contact bar; and
wherein the first contact bar and the second contact bar are arranged for contact with the tube outer surface.

22. The measurement apparatus of claim 21, wherein the tube outer surface has at least one surface pit thereon, the surface pit having a pit axial length, wherein the first contact bar has a bar axial length and the second contact bar has the bar axial length, and wherein the bar axial length is greater than the pit axial length.

23. The measurement apparatus of claim 20, further comprising a calibration block having a profile corresponding to a nominal tube diameter, for measurement of a calibration time of flight in a calibration mode wherein the probe is coupled to the calibration block with a calibration couplant having an associated calibration couplant temperature.

* * * * *